(12) United States Patent
Donohue

(10) Patent No.: US 11,141,926 B2
(45) Date of Patent: Oct. 12, 2021

(54) HIGH SPEED WELDER

(71) Applicant: Erdman Automation Corporation, Princeton, MN (US)

(72) Inventor: Morgan Donohue, Mendota Heights, MN (US)

(73) Assignee: Erdman Automation Corporation, Princeton, MN (US)

(*) Notice: Subject to any disclaimer, the term of this patent is extended or adjusted under 35 U.S.C. 154(b) by 0 days.

(21) Appl. No.: 16/817,000

(22) Filed: Mar. 12, 2020

(65) Prior Publication Data

US 2021/0283858 A1  Sep. 16, 2021

(51) Int. Cl.
*B29C 65/20* (2006.01)
*B29C 65/78* (2006.01)
*B29C 65/00* (2006.01)
*B29L 31/00* (2006.01)

(52) U.S. Cl.
CPC ............ *B29C 65/20* (2013.01); *B29C 65/782* (2013.01); *B29C 66/0342* (2013.01); *B29C 66/1142* (2013.01); *B29L 2031/005* (2013.01)

(58) Field of Classification Search
CPC . B29L 2031/005; B29C 65/782; B29C 65/20; B29C 65/2069; B29C 65/2076; B29C 65/2084; B29C 65/781; B29C 65/7841; B29C 66/1162; B29C 66/0342; B29C 66/1142; B29C 66/32; B29C 66/324; B29C 66/3262; B29C 66/349; B29C 66/5223; B29C 66/52231; B29C 66/5243; B29C 66/52431; B29C 66/5244; B29C 66/5245; B29C 66/5263; B29C 66/52631; B29C 66/843; E06B 3/9604; E06B 3/9608; B21D 53/74; Y10T 156/1744; Y10T 156/1746; Y10T 156/1751; Y10T 156/1776
USPC ......... 156/281, 304.1, 304.2, 556, 557, 559, 156/569
See application file for complete search history.

(56) References Cited

U.S. PATENT DOCUMENTS

| | | | |
|---|---|---|---|
| 7,184,146 B2 | 2/2007 | Trpkovski | |
| 7,921,064 B2 | 4/2011 | McGlinchy et al. | |
| 7,995,458 B2 | 8/2011 | Kwak et al. | |
| 8,250,023 B2 | 8/2012 | McGlinchy et al. | |
| 9,342,633 B2 * | 5/2016 | Hache | B21D 53/74 |
| 2007/0157455 A1 * | 7/2007 | Kownacki | B29C 66/73921 29/557 |

* cited by examiner

*Primary Examiner* — John L Goff, II
(74) *Attorney, Agent, or Firm* — Patterson Thuente Pedersen, P.A.

(57) ABSTRACT

A welder for constructing and welding plastic fenestration structures, including parts storage bins structured to store and support parts to be assembled to create the plastic fenestration structures; wheels that receive the parts from the parts storage bins; aligners that position the parts relative to one another; heating plates that apply heat to ends of the parts thereby rendering at least a portion of the ends of the parts molten; parts shifters operably shiftable between a first position adjacent the wheels and a second position remotely located from the wheels that shift the parts to a fusing position in which adjacent parts are abutted together at a fusing station to produce the plastic fenestration structure; and at least one cooling station at which the plastic fenestration structure is held.

20 Claims, 18 Drawing Sheets

HIGH SPEED WELDER

TECHNICAL FIELD

The invention generally relates to plastic welding, for example welding of vinyl or polyvinyl chloride (PVC) materials. More particularly, the invention relates to welding of plastics and plastic structures utilized in making window sashes and window frames.

BACKGROUND

Insulated glass generally includes at least two panes of similarly shaped glass, called lites, separated from one another by a perimeter spacer. The two or more lights bonded together with their peripheral perimeter spacer are referred to as an insulated glass unit (IGU). Building codes in many areas of the country require insulated glass installation as an energy conservation measure, particularly for large commercial properties, because insulated glass units (IGUs) have much greater insulating value than a single pane of glass alone.

A primary sealant binds the two lites to the spacer, preventing ambient air movement into the space between the glass panes. The spacer in an IGU is inset from the peripheral edges, creating a trough-shaped space around the ICU's perimeter. Two sides of the trough are defined by the two lites, and the third is defined by the spacer. A gas such as argon, xenon, or krypton often fills the interior space between the lites. Filling the interior space with a gas that is denser than air markedly increases the IGU's energy efficiency and helps prevent condensation from forming on the IGU's interior surfaces. A secondary sealant fills the trough-shaped space around the IGU's perimeter to further improve the IGU's energy efficiency.

Insulated glass units are used in curtain wall construction typically utilized in commercial buildings and also often mounted in sashes which are generally movable and utilized in both residential and commercial construction. Sashes may be used in double hung or slider windows in which case, they are mounted in frames in which the sashes are slidable relative to one another either vertically or horizontally. Sashes may also be mounted in a frame in a hinged fashion. This configuration is commonly used in casement windows and other windows.

Sashes and window frames may be manufactured from a variety of materials including wood, aluminum extrusions and plastic extrusions. Plastic extrusions are commonly made from the polyvinylchloride. Wooden or aluminum frame or sash materials are commonly joined with the use of adhesives. Plastic frame or sash materials are generally joined by the application of plastic welding techniques. Plastic welding techniques may, for example, include techniques in which the ends of two pieces of material that are to be joined are heated and then pressed together while the heated materials at the ends are still molten thereby fusing the two pieces together permanently as the molten material cools and hardens.

Typically, in the known prior art, cycle times for manufacturing PVC frames or sashes require about 30 to 40 seconds for loading of the pieces to be welded followed by 5 to 10 seconds for referencing the pieces relative to each other. Heating of the portions to be welded generally takes about 20 seconds while mating and fusing of the pieces requires approximately 20 seconds. Finally, offloading the welded product generally requires about 15 seconds. This means that a manufacturing operation requires a total cycle time of about one to one- and one-half minutes per welded frame or sash.

One challenge of welding sashes or frames of vinyl is that as a weld is accomplished weld flashing is created. Weld flash protrudes from the surface of the sash or frame at the location of the weld and must be removed and consists of molten plastic that has squeezed out of the joint and has re-hardened. The removal of weld flashing is generally referred to by those skilled in the art as corner cleaning and is accomplished by machining away the hardened weld flashing. A typical cycle time for corner cleaning is 60 to 90 seconds. Prior to corner cleaning the welds must cool enough so that the weld flashing hardens sufficiently to permit proper machining of the protruding flashing material. Premature machining of flashing material will foul the cutting tools with molten plastic. The length of time required for hardening of the flashing material varies depending upon environmental conditions but, under some common circumstances is approximately 1 minute.

Commonly, finished welded sashes or frames are conveyed to another area of the manufacturing floor for the corner cleaning process. Some prior art corner cleaning processes utilize a rotating head robot for corner cleaning.

Some prior art welding machinery utilizes a pre-clamping option. That is, in an effort to expedite the welding process, sash or frame parts are pre-clamped in proper relative position and orientation prior to being subject to the heating and fusing stages of the welding process. The sash or frame parts our pre-clamped so that the corners are separated from one another and do not meet until after heat is applied to the corners for fusing.

Some manufacturers process 3000 to 5000 windows per day. In the circumstance that these are double hung windows or other window designs utilizing two sashes and a frame this can amount to 9000 to 15,000 construction operations performed per day.

Commonly window manufacturers find that approximately 60% to 70% of their manufacturing volume falls into three size categories that are relatively standard. This means that a large fraction of the manufacturing volume can be processed by setting up manufacturing machinery to process these commonly produce sizes.

For the purpose of welding, PVC begins to soften at about 140° C. Heating plates that are utilized in the heating process generally are maintained at a temperature of about 500° C. Heating plates are typically formed of aluminum and covered with a self-adhesive sheet of Teflon to mitigated adhesion of the welded material. Heating plates are generally formed by casting aluminum around heating elements. This makes for more even heat distribution from the heating elements to the aluminum plate. More even heating distribution results in less hotspots on the plates and more even heating as well as less burnout of the heating elements.

Accordingly, there is still an opportunity to improve the plastic welding process, for example, by expediting the plastic welding process.

SUMMARY

Embodiments of the invention improve the manufacturer of welded plastic window structures such as sashes and frames and the like by speeding the process as well as by making the machinery by which the process is applied more space efficient safer to operate and labor efficient. It is expected that embodiments of the invention will reduce cycle times to weld a sash or window frame to approximately 20 seconds per unit. It is also expected that embodiments of the invention will utilize less floor space than current plastic welding applications. Further, it is expected that the invention will reduce labor requirements from two workers to one. In addition, operator safety is improved because the operator need not enter the processing area to supply parts.

A high-speed welder, according to an example embodiment of the invention, generally includes parts loading hoppers located at corners of the high-speed welder. An example embodiment further includes a wheel structure for centering or referencing the parts to be welded, a heating station, a fusing station and structures for conveying the completed structure to corner cleaning and optionally a corner cleaning station. According to an example embodiment of the invention, the wheel structure, heating station and fusing station may utilize servomotors to control their movements.

The parts loading hoppers are located at corners of the high-speed welder and support the ends of parts to be welded. Thus, parts are supported at each end in the hoppers but extend between the hoppers from one corner to an adjacent corner. According to an example embodiment of the invention, the capacity of the parts loading hoppers is about 12 to 15 parts. According to an example embodiment of the invention, parts stored in the hoppers are stacked vertically so that parts extend with their long axis horizontal but are located vertically one above another. According to another example embodiment of the invention, parts stored in the hoppers are stacked horizontally so that parts extend with their long axis horizontal but are located horizontally in ranks one behind another. The hoppers may also be stacked at an angle to horizontal or vertical. The parts capacity of the hoppers facilitates manufacturing efficiency by maintaining a sufficient inventory of parts in the loading hoppers so that a single operator can keep the loading hoppers sufficiently supplied for continuous efficient operation of the high-speed welder according to example embodiments of the invention. Thus, an operator can be continuously loading the machine while the machine is operating and utilizing parts that are stored in the hoppers. Highest efficiency is achieved with example embodiments of the invention if it is set up to run like sizes or batched sizes to accommodate the hopper feed.

In addition, the operator need not enter the working space in which the high-speed welder operates thus improving safety of the operator.

It is expected that vertical storage of parts in the hoppers will be most efficient in terms of floor space utilized according to example embodiments of the invention.

According to an example embodiment of the invention a wheel structure is located adjacent or below the parts loading hoppers. The wheel structure is positioned to receive parts from the parts loading hoppers in one of multiple positions located around the wheel structure. According to an example embodiment of the invention, the wheel structure includes four parts holding positions. However, a different number of parts holding positions may be utilized within the scope of the invention. The wheel structure receives individual parts from the hoppers into one of the multiple holding positions and indexes and centers the parts so that they are centered in one of the multiple positions of the wheel structure.

While it is expected that the utilization of a wheel structure will be highly efficient, according to another embodiment of the invention drop-down feeding may be utilized such that the frame parts can be moved from the dropped location by a shuttle or an alternating shuttle.

To facilitate loading, maintenance and operation of the high speed welder in accordance with example embodiments of the invention, the invention includes two L-shaped catwalks each of which includes a movable linear catwalk portion or portions that can be repositioned to adjust for the sizing of frame and sash parts that are being processed and thus, the relative locations of the parts loading hoppers. The movable linear catwalk portions are movable along with the parts hoppers to provide continuing access to the parts hoppers for the operator when the parts hoppers are relocated to accommodate different sized parts.

It is expected that with appropriate sequencing and scheduling by the operator, that the high-speed welder according to embodiments of the invention will evidence speed gains over the existing prior art in such a way as to increase manufacturing productivity by about four times.

Assuming that an embodiment of the invention is utilized with wheels having four places to receive parts, it is expected that it will take approximately 60 seconds to empty the parts from the loaded wheels due to the fact that there three positions out of four are occupied by frame or sash parts at any given time.

According to example embodiments of the invention, parts are sequenced first by placing them in the hopper. Next parts are transferred from the hopper to a space on the wheel structures to accommodate centering or referencing. Once the parts are centered or referenced, ends of the frame or sash parts are moved to be placed in contact with a heating plate of a heating unit at a heating station. The heating plate is typically angled at 45° relative to the frame or sash parts assuming that the frames or sashes to be manufactured are rectangular. Naturally, the vast majority of frames or sashes manufactured are rectangular. Heating plates may be angled differently if for example, triangular, hexagonal or octagonal windows are being manufactured. The two parts to be fused are pressed against the heating plate of the heating unit at a corner simultaneously or individually and the heating plate melts a portion of the structure of the part to be fused. After the frame or sash part is sufficiently heated to render the vinyl or other plastic material molten, the heating plate is withdrawn, and the frame or sash parts are promptly pressed together at the corners thereof to accomplish fusing of the parts at a fusing station. This is typically done simultaneously at four corners of a rectangular window or sash unit, though this should not be considered to be limiting. In practice, all four corners of a rectangular frame or sash unit are indexed, heated and fused simultaneously to create the finished frame or sash unit efficiently.

The parts are held together for a sufficient length of time for the molten plastic to at least partially harden to achieve sufficient strength to hold the completed structure together and the completed frame or sash unit is dropped from the bottom of the machine to be conveyed for further cooling prior to corner cleaning. It is expected that the cycle time for heating will be approximately twenty seconds. If for some reason, it is desired to slow the cycle time a delay prior to heating can be introduced. For example, a ten second delay before heating may be followed by twenty second heating event.

According to an example embodiment of the invention, heating plates are positioned at a 45° angle to the ends of the sash or frame parts that are to be joined. The ends of the sash or frame parts to be joined are miter cut at a 45° angle as well. The heating plates of the heating unit are for example made of aluminum that is cast around electric heating elements in which two heating sides are parallel. Movement of the heating plates can be accomplished by, for example, servomotors, hydraulic actuators or pneumatic actuators.

According to an example embodiment of the invention, the heating plates may be covered with a self-adhesive Teflon material to mitigate adhesion between the melted plastics and the heating plates. Heating plates are mounted on movable structures so that they can be introduced between two of the frame or sash parts so that to frame or sash parts may be heated simultaneously on a single plate on opposite sides and then retracted from the space to allow apposition of the frame parts for fusing and cooling. For example, the heating plates may be linearly introduced into the space between the two frame or sash parts and linearly withdrawn at a 45° angle to the corner. Heating plates may also be introduced linearly and in a vertical fashion.

The heating plates are maintained at a temperature of approximately 500° C. according to one example embodiment.

After a completed frame or sash structure is released from the fusing unit and prior to corner cleaning the completed structure is expected to pass through multiple cooling zones according to an example embodiment of the invention. According to one example embodiment of the invention the cooling zones are located below the indexing zone, the heating zone and the fusing zone. It is expected that the completed sash or frame structure will be held in each of the multiple cooling zones for about 20 seconds according to an example embodiment of the invention.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
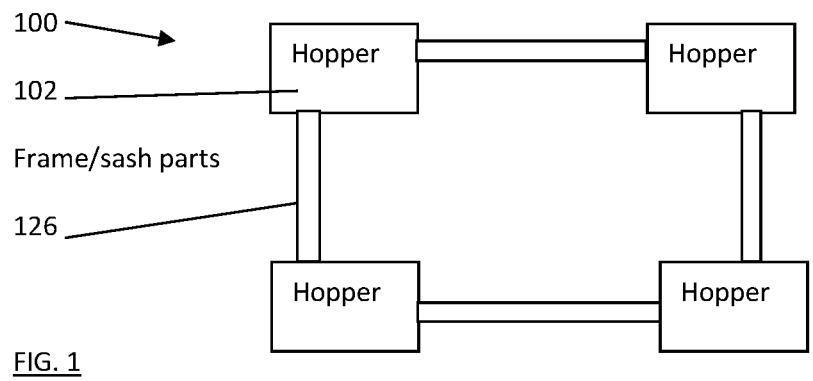
FIG. 1 is a schematic depiction of parts loading hoppers and frame or sash parts according to an example embodiment of the invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Referring to FIGS. 1, 3, 4 and 5, high-speed welder 100 according to an example embodiment of the invention generally includes parts hoppers 102, wheel structure 104, parts shifter 106, heating station 108, fusing station 110, cooling conveyer 112 and corner cleaner 114.

Referring to FIGS. 1, 2, 6 and 10, parts hoppers 102 generally include first parts hopper 116, second parts hopper 118, third parts hopper 120, and fourth parts hopper 122. Parts hoppers 102 are located in a generally at corners of high-speed welder 100.

Parts hoppers 102 generally include angled vertical supporting structure 124 into two of which frame or sash parts 126 are loaded, linear actuator 128 and supporting structure 129. Linear loading actuator 128, in the depicted embodiment, is located proximate the bottom of vertical supporting structure over 124 which is supported by supporting structure 129. In the depicted embodiment, linear loading actuator 128 is shiftable horizontally generally perpendicular to vertical supporting structure 124.

Figure 3:
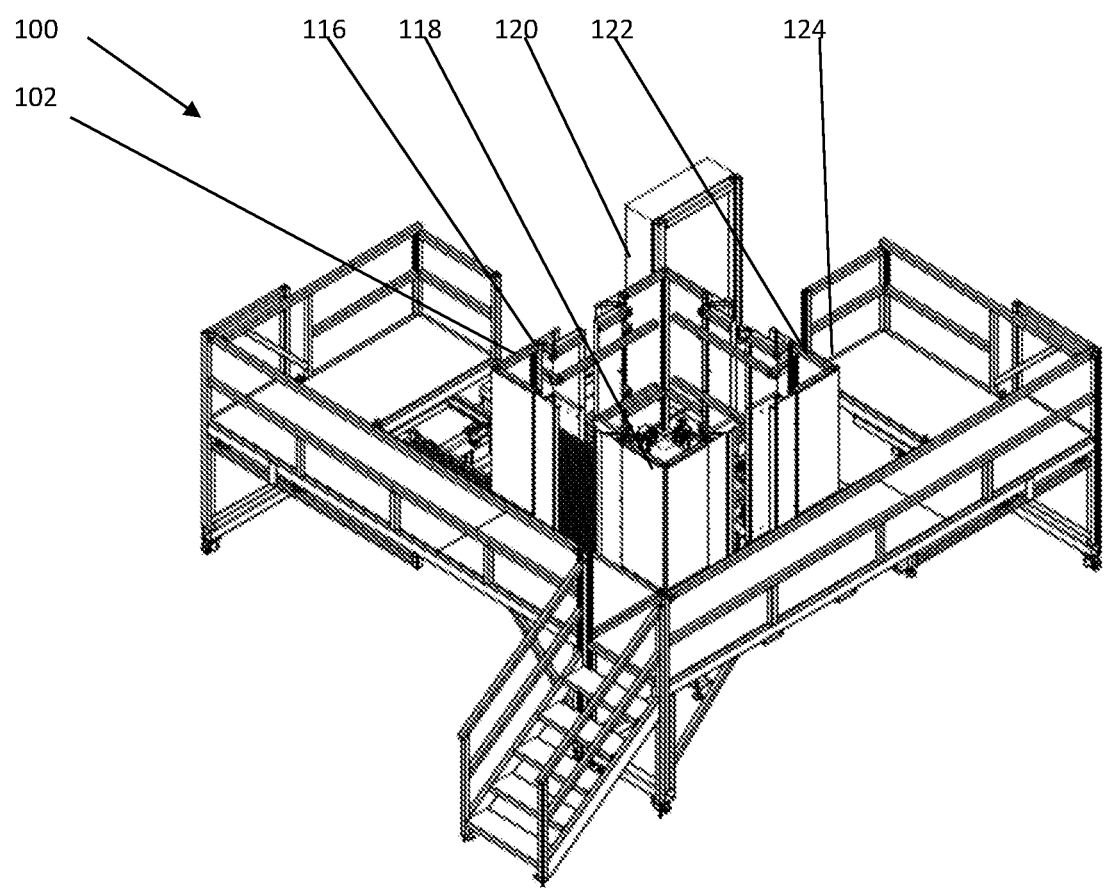
FIG. 3 is a perspective view of a high-speed welder and surrounding access platforms according to an example embodiment of the invention.
Figure 4:
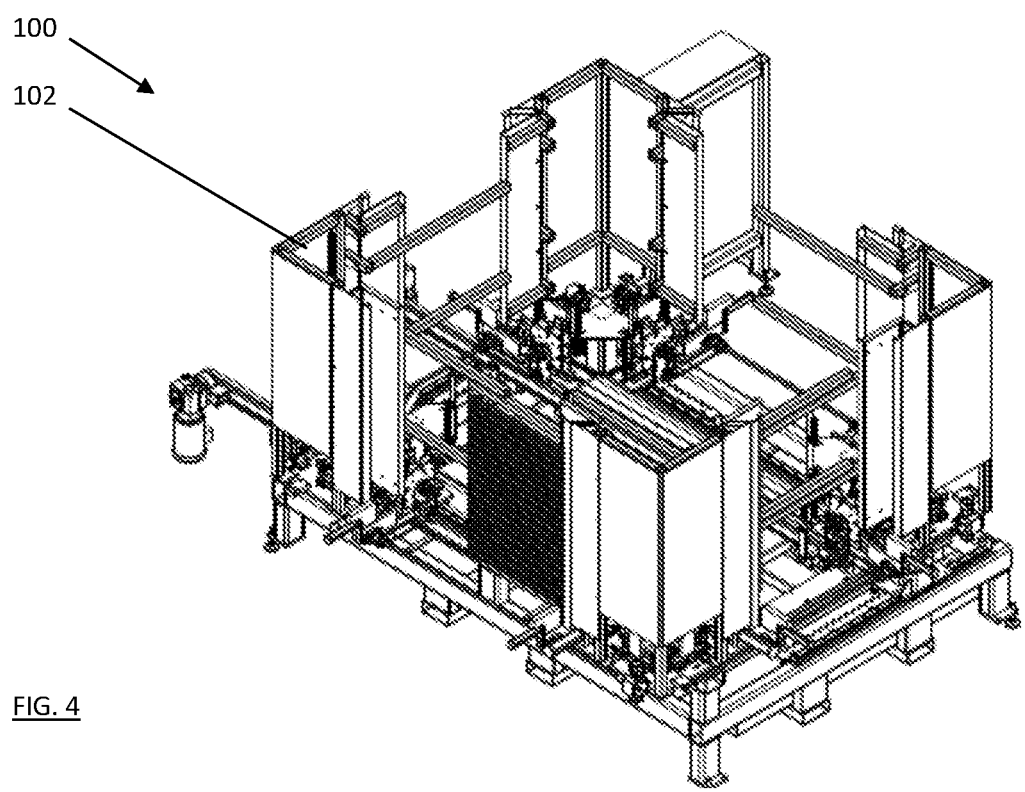
FIG. 4 is a perspective view of a high-speed welder with the parts loading hoppers positioned for relatively longer frame or sash parts according to an example embodiment of the invention.
Figure 5:
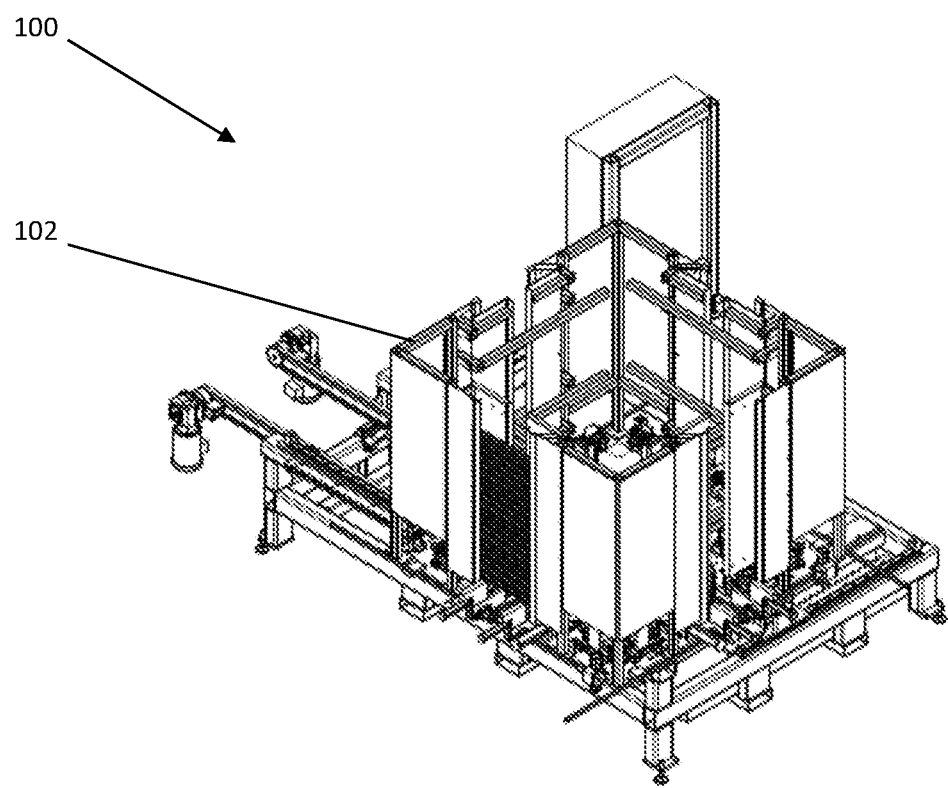
FIG. 5 is a perspective view of the high-speed welder of FIG. 4 with the parts loading hoppers positioned for shorter frame or sash parts.

Referring to FIGS. 3, 4 and 5, parts hoppers 102 are located at corners of high-speed welder 100. Generally, and in the depicted embodiment, four parts hoppers 102 will be utilized because the vast majority of window sashes and frames are rectangular in shape. According to the invention, example embodiments may utilize between three and eight or more parts hoppers 102 to accommodate frames or sashes that are triangular, rectangular, pentagonal, hexagonal or octagonal in shape, for example. Parts hoppers 102 may also be angled or horizontally oriented rather than vertically oriented. So, the vertical nature of parts hoppers 102 should not be considered limiting. Referring to FIGS. 3, 4 and 5, parts hoppers 102 are just in position to accommodate frame or sash parts 126 different lengths.

Wheel structure 104 generally includes wheel support 130, axle 132, hub 134, part holders 136 and bearing 138. Wheel structure 104 is located proximate the bottom of parts hoppers 102 and adjacent linear actuator 128. This relationship is depicted for example FIG. 6.

Figure 6A:
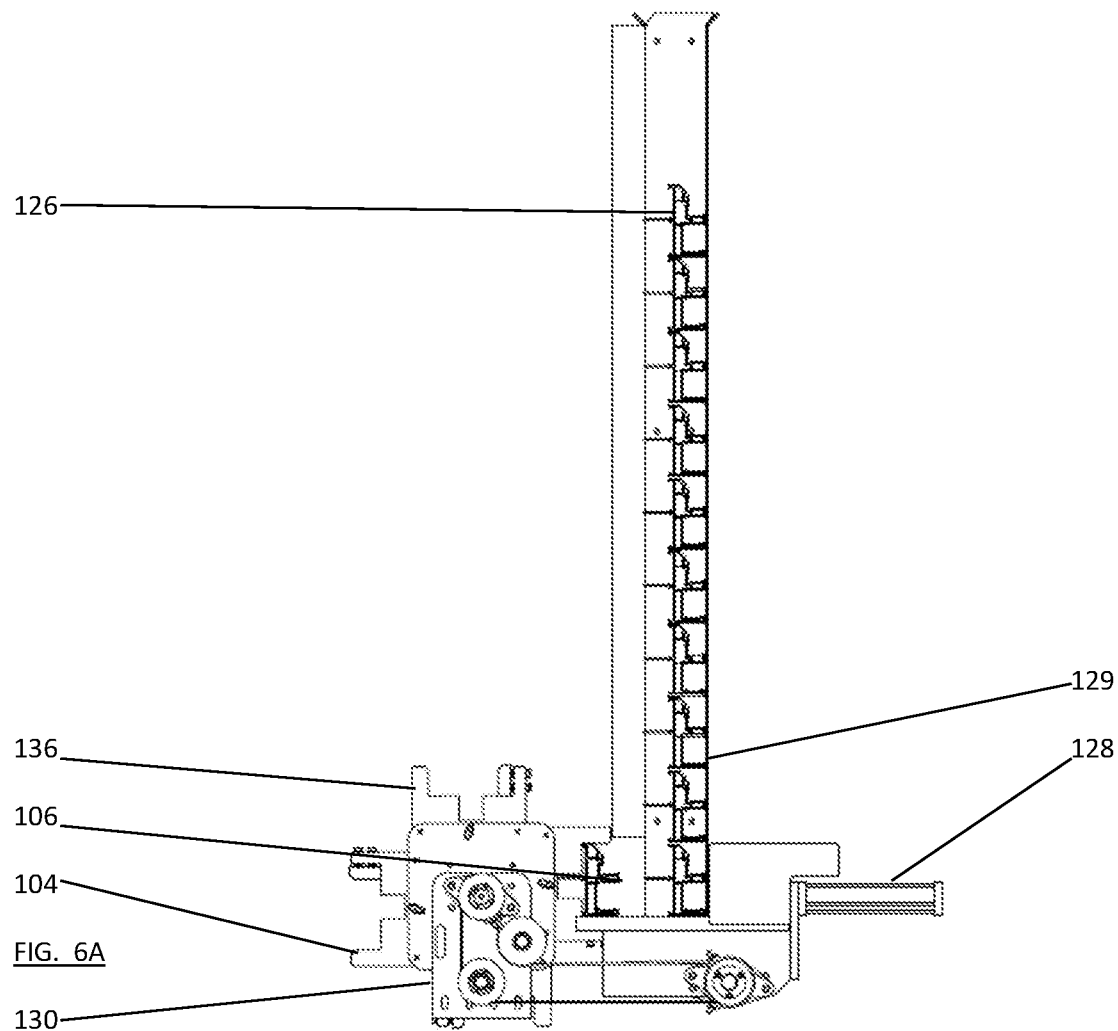
FIG. 6A is an elevational view depicting a parts loading hopper and wheel structure according to an example embodiment of the invention.
Figure 7A:
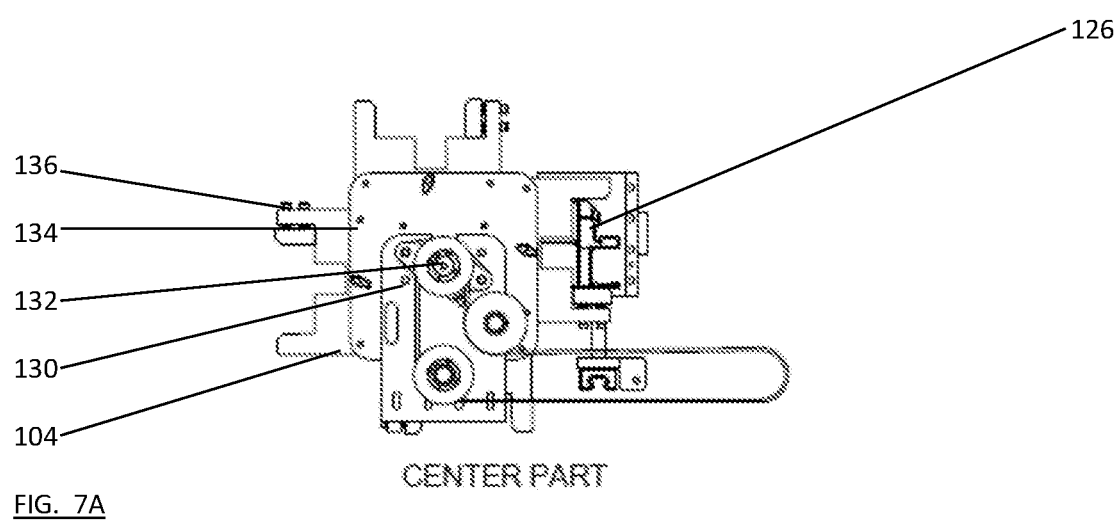
FIG. 7A is an elevational view depicting a wheel structure according to an example embodiment of the invention.
Figure 8A:
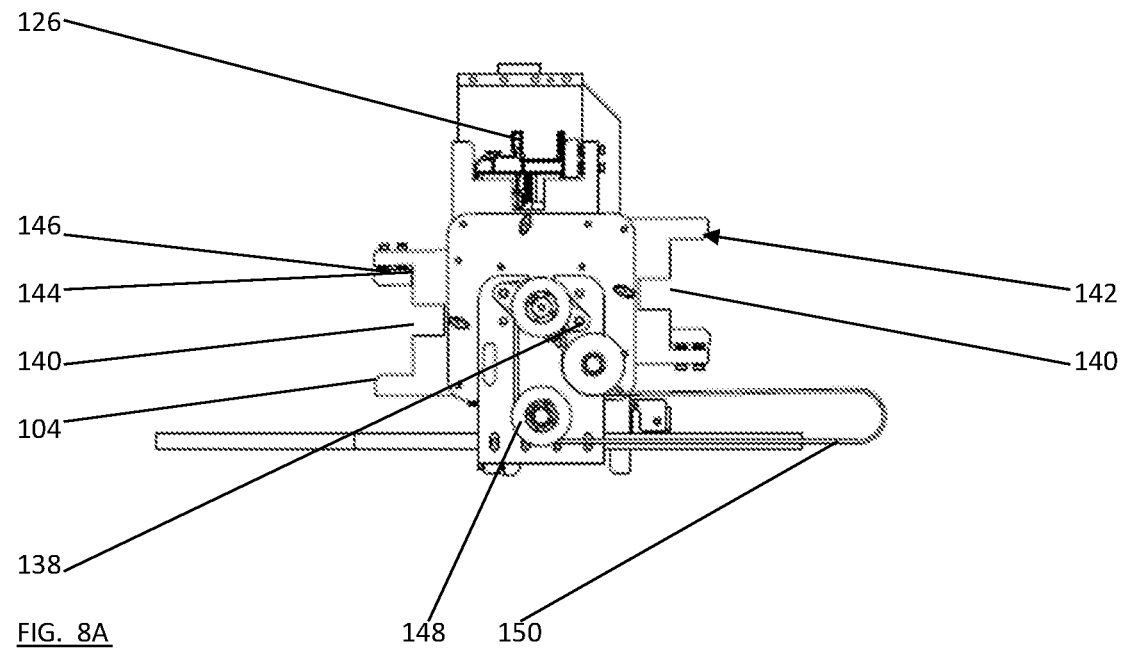
FIG. 8A is an elevational view depicting a wheel structure and an indexer according to an example embodiment of the invention.

Referring to FIGS. 6A, 7A and 8A, in the depicted embodiment wheel support 130 includes bearing 138 supporting axle 132. Axle 132 further supports hub 134 which in the depicted embodiment is a generally square structure. Hub 134 supports parts holders 136 and is rotatably mounted on axle 132 which is in turn supported by bearing 138. In the depicted embodiment, four parts holders 136 each presents parts receiving cavity 140 bounded by yoke 142 and biased gripper 144. Biased gripper 144 is biased inwardly by, for example, springs 146. Pulleys 148 and belt 150 couple wheel structure 104 to motor (not shown).

Figure 6B:
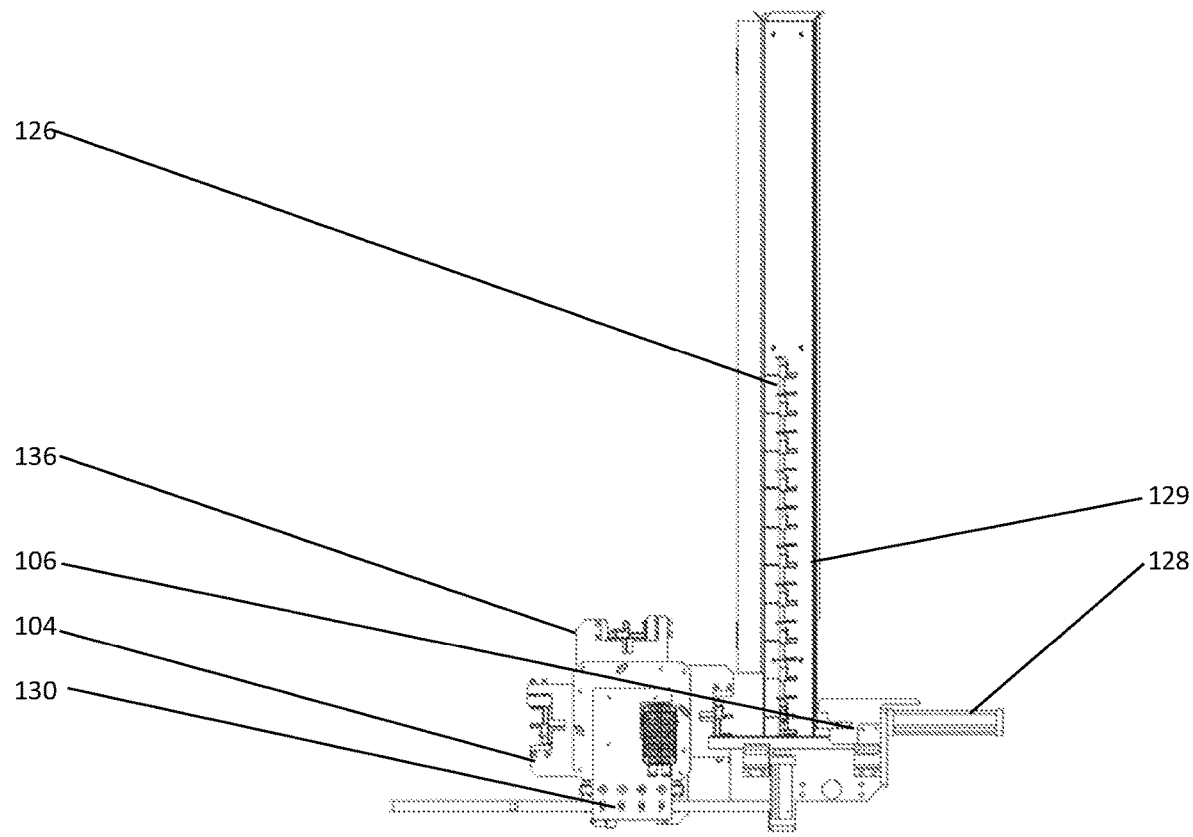
FIG. 6B is an elevational view depicting a parts loading hopper and wheel structure according to a further example embodiment of the invention including one or more servomotors.
Figure 7B:
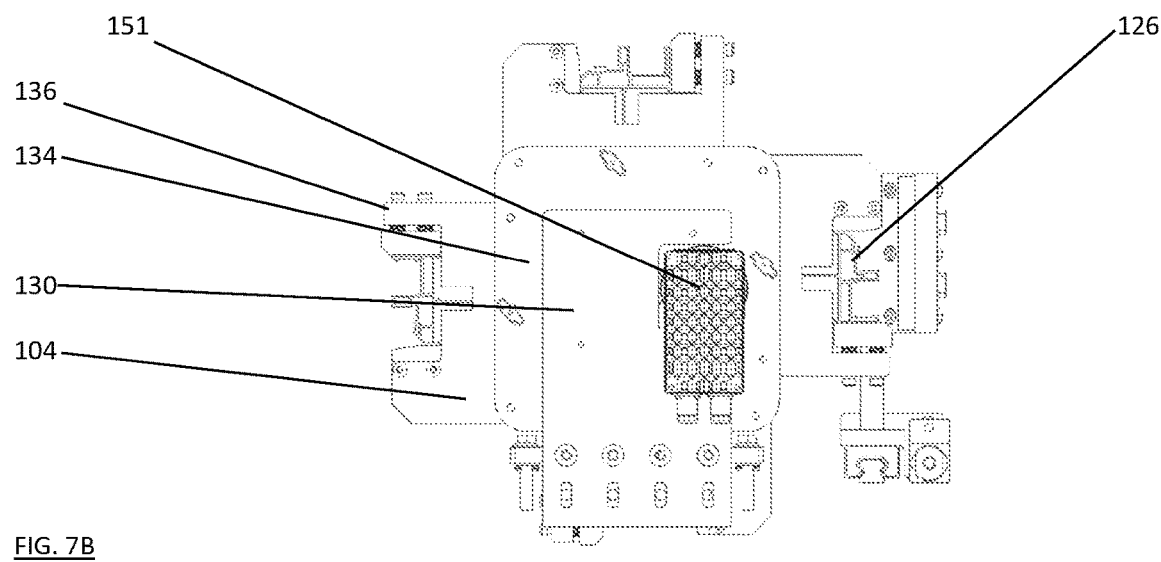
FIG. 7B is an elevational view depicting a wheel structure according to a further example embodiment of the invention including one or more servomotors.
Figure 8B:
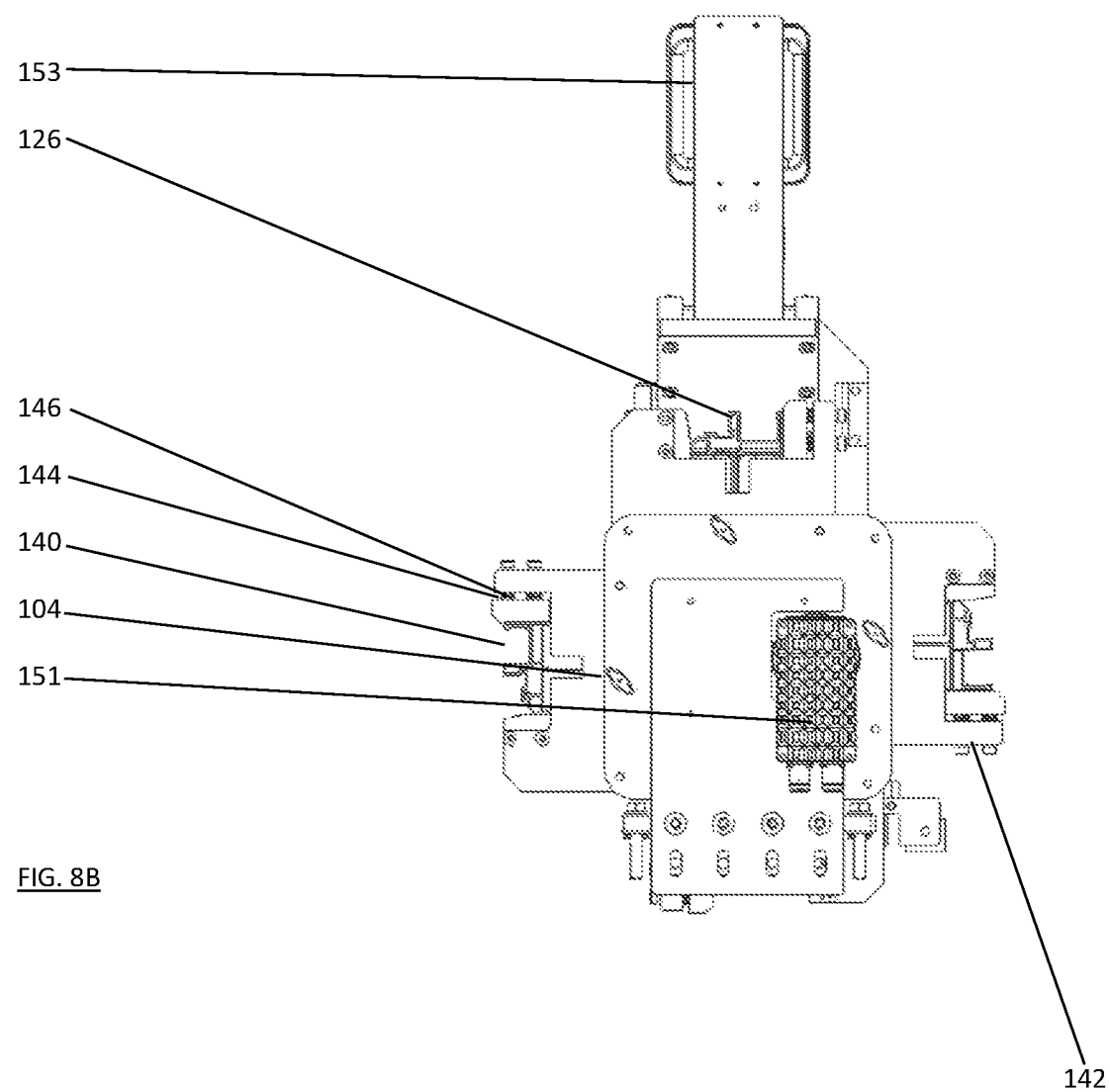
FIG. 8B is an elevational view depicting a wheel structure and an indexer according to a further example embodiment of the invention including one or more servomotors.

Referring to FIGS. 6B, 7B and 8B, in the depicted embodiment wheel support 130 is depicted including wheel servomotor 151. Axle 132 and bearing 138 are present but not visible. Similar structures are labeled with similar reference numbers to those utilized in FIGS. 6A, 7A and 8A.

Referring particularly to FIG. 8B heating plate servomotor 153 is depicted. Heating plate servomotor 153 is operably coupled to heating plate 126 and controls movement thereof.

Figure 9:
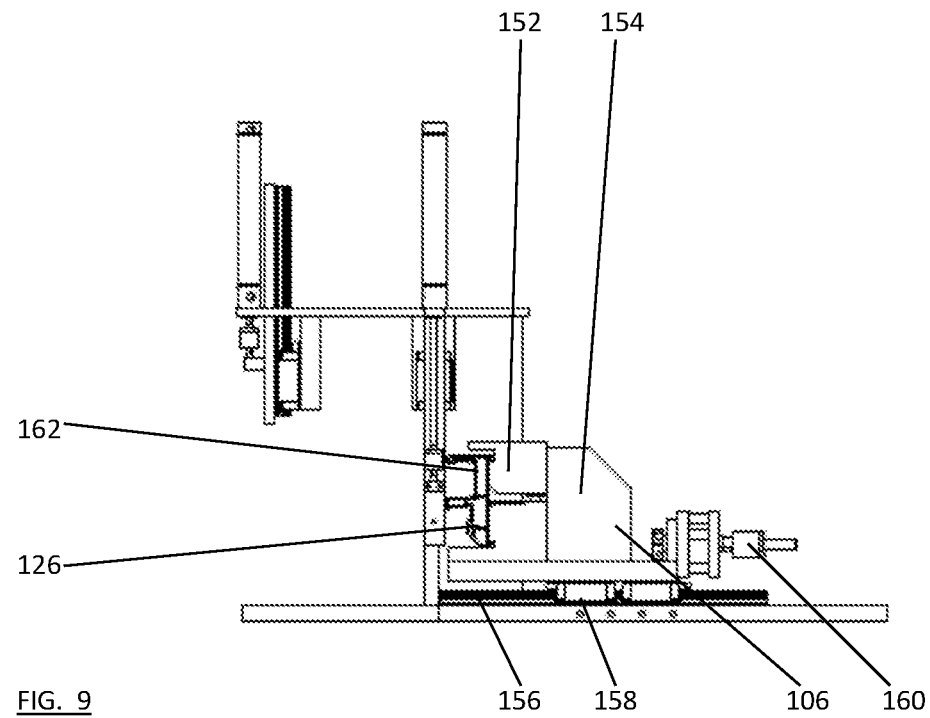
FIG. 9 is an elevational view depicting a parts moving structure according to an example embodiment of the invention.
Figure 10A:
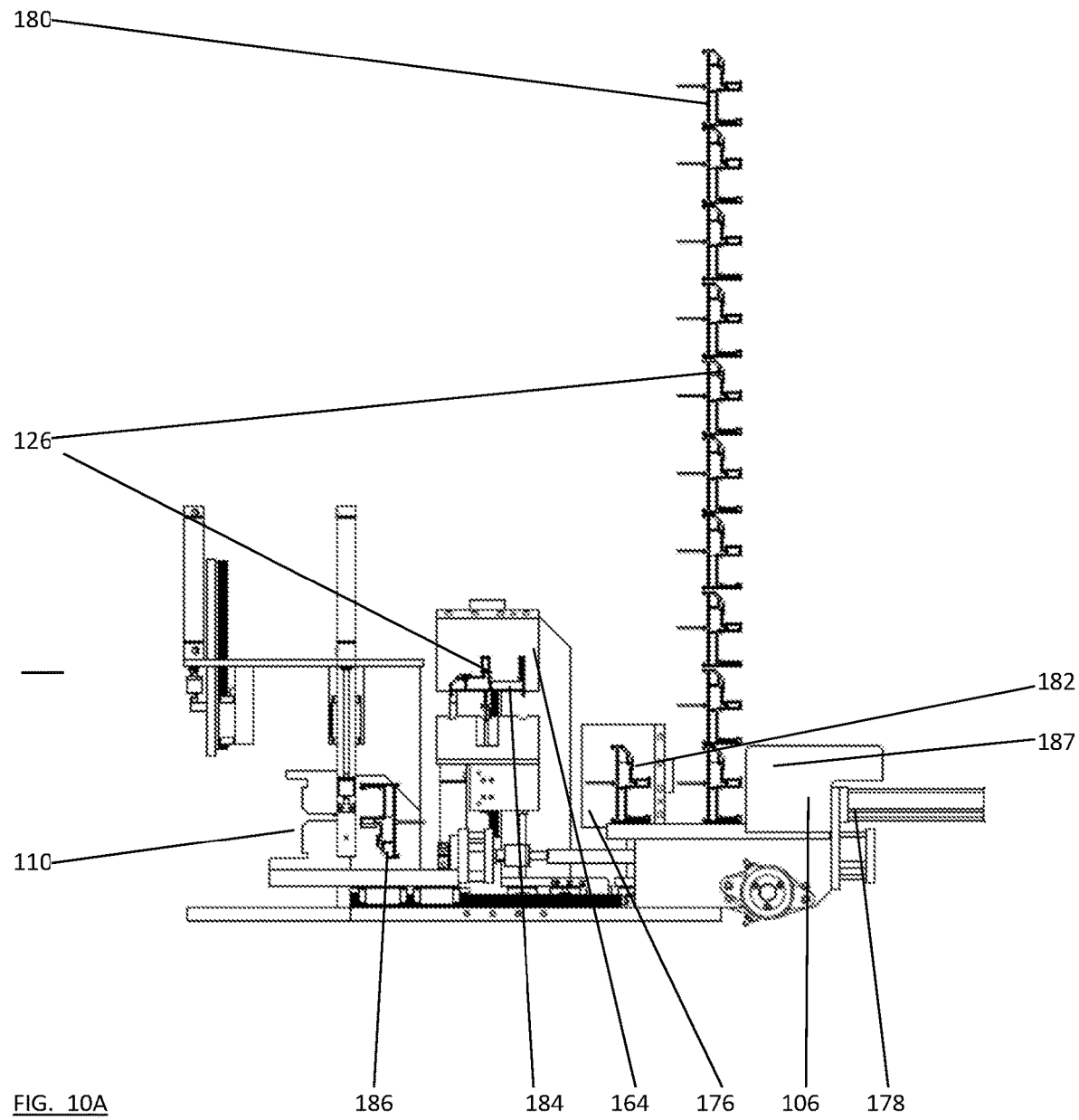
FIG. 10A is an elevational view depicting a parts loading hopper and frame or sash parts in three handling positions as well as a parts moving structure according to an example embodiment of the invention.
Figure 11A:
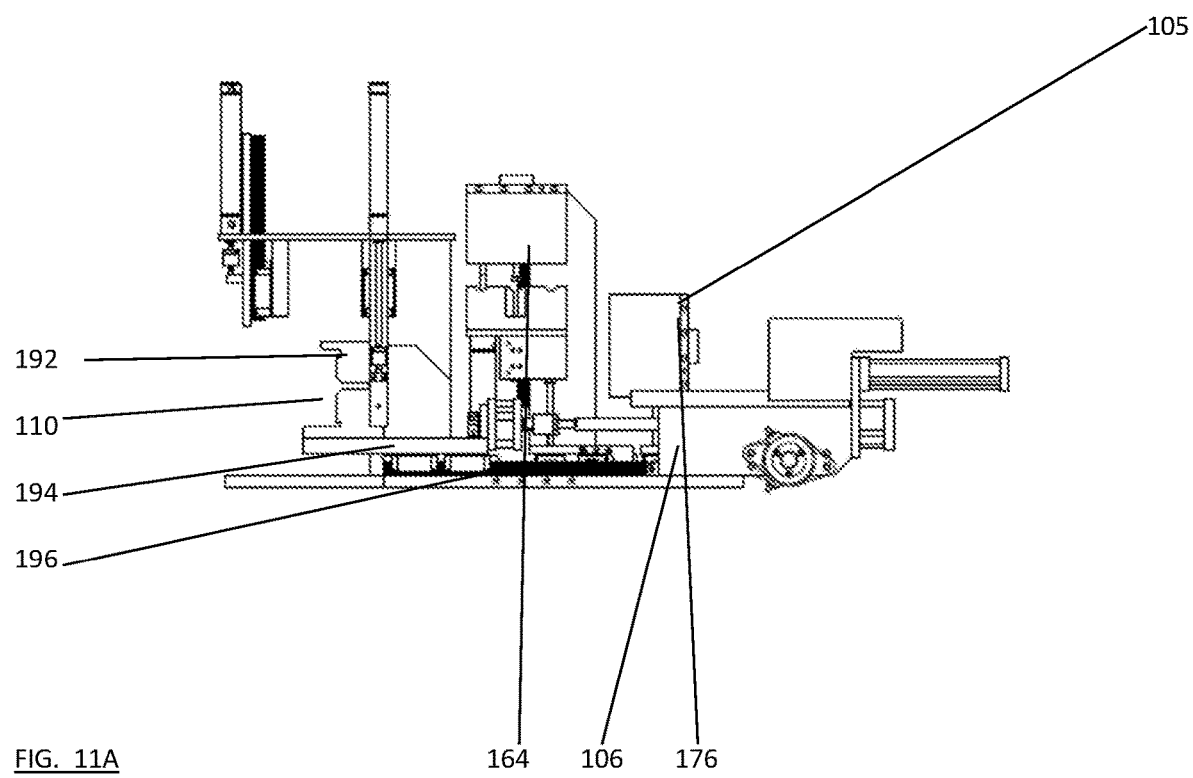
FIG. 11A is an elevational view depicting a parts moving structure according to an example embodiment of the invention.

Referring to FIGS. 9, 10A and 11A, parts shifter 106 generally includes parts gripper 152, parts gripper support 154, linear track 156, linear slider 158 and linear actuator 160. Parts gripper 152 is structured and adapted to receive frame or sash parts 126 in receiving receptacle 162. Parts gripper 152 is supported upon parts gripper support 154. Parts gripper support is slidably secured to linear track 156 by linear slider 158. Linear actuator 160 is coupled to parts gripper support 154 and structured for linear actuation generally parallel to linear track 156. Parts gripper 152 and parts gripper support 154 are located so as to moved between or adjacent to wheel supports 130.

Figure 10B:
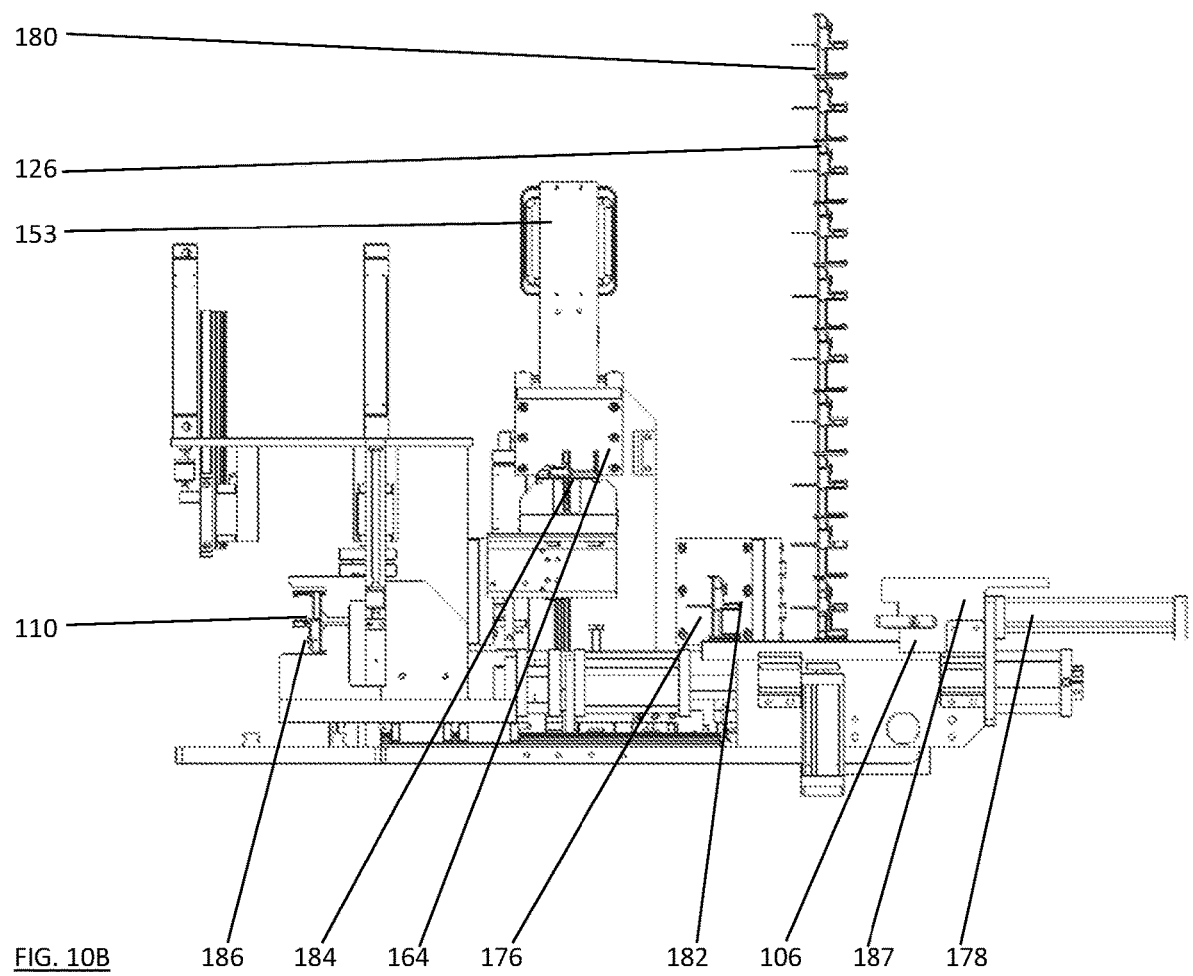
FIG. 10B is an elevational view depicting a parts loading hopper and frame or sash parts in three handling positions as well as a parts moving structure according to a further example embodiment of the invention including one or more servomotors.
Figure 11B:
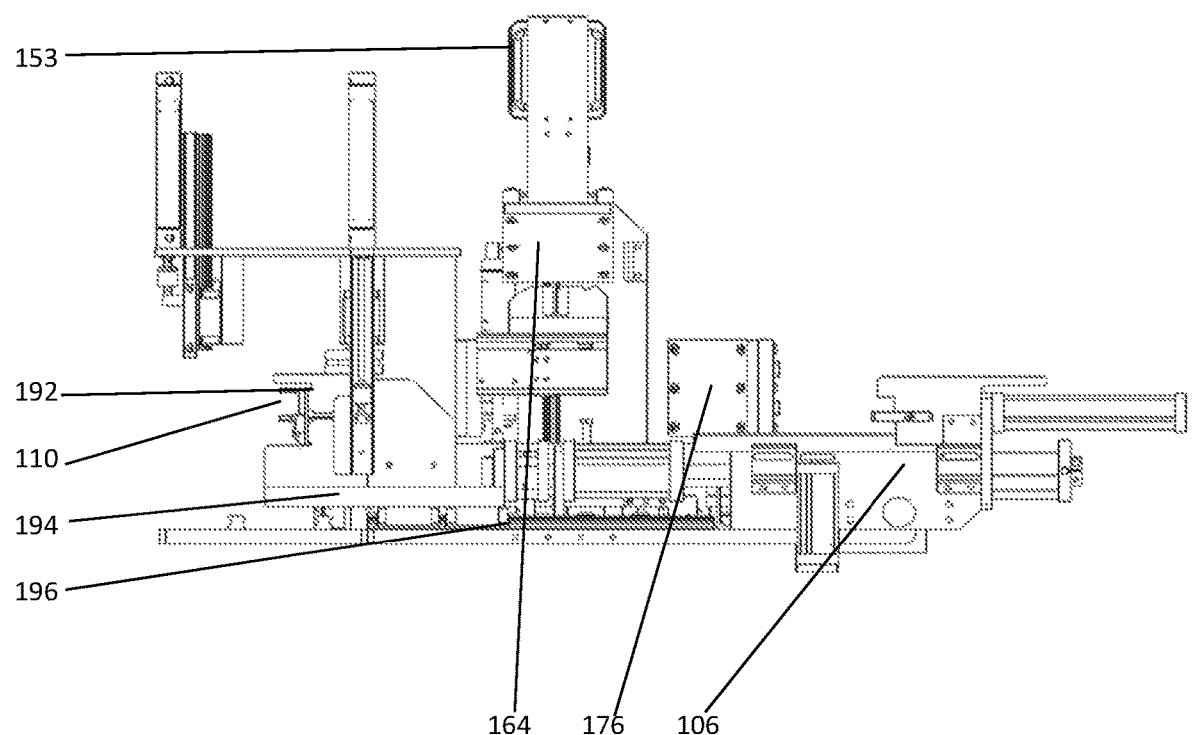
FIG. 11B is an elevational view depicting a servomotor actuated parts moving structure according to a further example embodiment of the invention.

Referring to FIGS. 10B and 11B, similar structures to those depicted in FIGS. 10A and 11A are depicted along with the addition of heating plate servomotor 153. Similar structures are labeled with similar reference numerals to those depicted in FIGS. 10A and 11A. Heating plate servomotor 153 is operably coupled to heating plate 164 and heating plate support 166 and controls movement of heating plate 164 relative to heating plate support 166.

With reference to FIGS. 10A, 11A, 12A, 16A and 17A heating station 108 generally includes heating plate 164, heating plate support 166, heating plate actuator 168, product support 170, product support sliders 172 and product support tracks 174. Heating plate 164 is angled approximately 45° from vertical in the depicted embodiment and is oriented approximately 45° to a long axis of frame or sash parts 126. Heating plate 164 is structured to be capable of maintaining a temperature of about 500° C. Heating plate 164 may be formed, for example, of aluminum and covered with, for example, a self-adhesive sheet of Teflon to mitigate adhesion of welded material. Heating plate 164 may be formed by casting aluminum around heating elements. This makes for more even heat distribution from the heating elements to the aluminum plate. More even heating distribution results in less hotspots on the plates and more even heating as well as less burnout of the heating elements.

Heating plate actuator 168, in the depicted embodiment, is a linear actuator such as a hydraulic or pneumatic cylinder and piston. Heating plate actuator 168 is coupled to product support 170 and heating plate support 166 and is adapted to move heating plate 164 between a first position proximate product support 170 and a second position remote from product support 170.

Heating plate servomotor 153 as depicted in the example embodiments in FIGS. 10B, 11B, 12B, 16B and 17B is coupled to product support 170 and heating plate support 166 and is adapted to move heating plate 164 between a first position proximate product support 170 and a second position remote from product support 170.

Referring particularly to FIGS. 10A and 11A, aligner 105 generally includes alignment plate 176 and alignment plate positioner 178. Alignment plate 176 is angled at approximately 45° to the horizontal and to frame or sash parts 126 and is positioned generally vertically about a perpendicular axis. Alignment plate positioner 178 locates alignment plate 176 relative to frame or sash parts 126. Alignment plate positioner 178 may include, for example, a linear actuator such as a hydraulic pneumatic cylinder.

Referring particularly to FIG. 10A, relative positions of frame or sash parts 126, alignment plate 176 and parts shifter 106 are depicted. Frame or sash parts 126 are depicted in hopper storage 180, alignment position 182, heating position 184 and fusing position 186. Frame or sash parts 126 are supported in alignment position 182, heating position 184 and fusing position 186 by wheel structure 104 which is not depicted in FIG. 10 for clarity. Hopper eject 187 is also depicted.

Figure 12A:
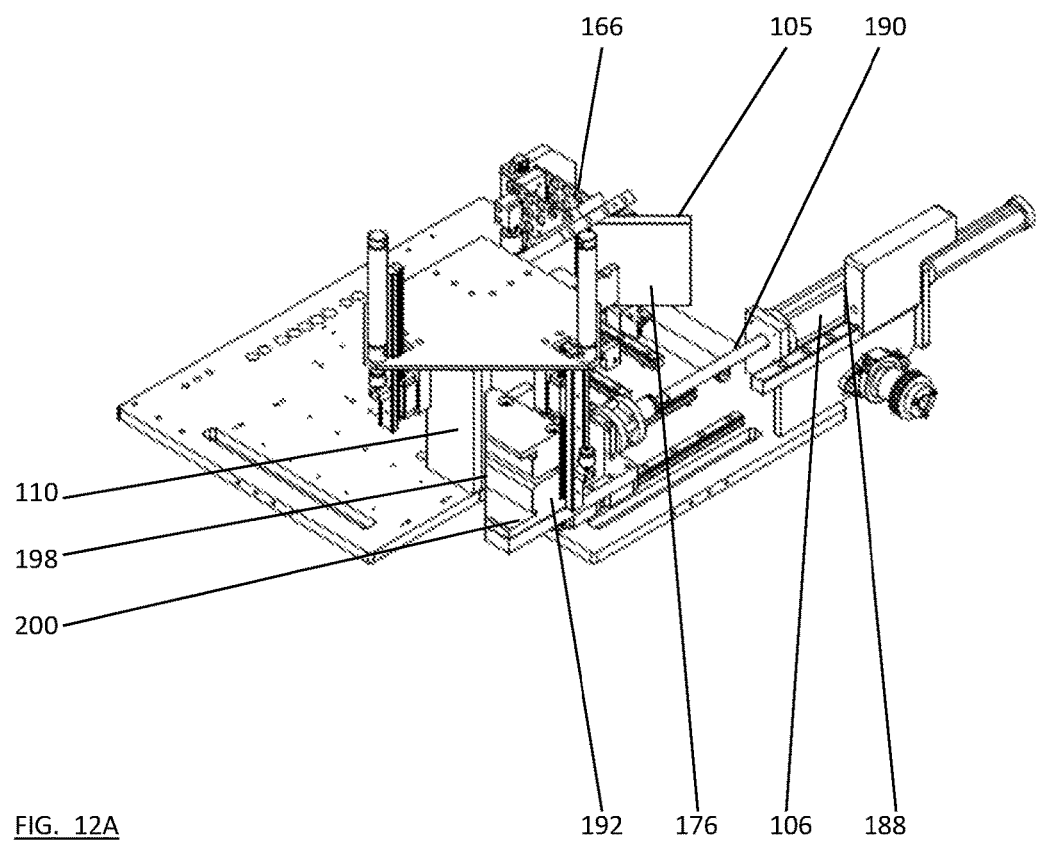
FIG. 12A is a perspective view of a picking and indexing structure and a heat plate according to an example embodiment the invention.

Referring particularly to FIGS. 11A and 12A, parts shifter 106 is depicted in an extended position. Parts shifter 106 generally includes linear actuator 188, connecting rod 190, part gripper 192, parts slider 194 and slider track 196. Linear actuator is coupled by connecting rod 190 to part gripper 192. Part gripper 192 is shaped to conform to frame or sash parts 126 and includes beveled portion 198 and parts receiving portion 200. Parts shifter 106 moves frame or sash parts 126 to fusing station 110.

Figure 12B:
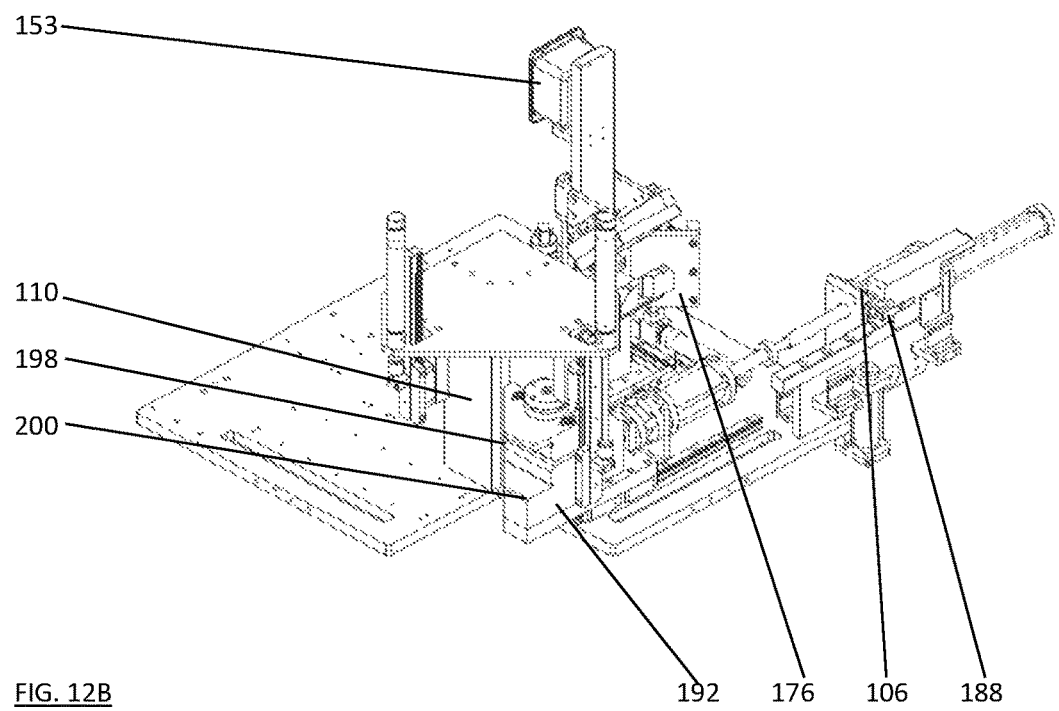
FIG. 12B is a perspective view of a picking and indexing structure, a heat plate and one or more servomotors according to a further example embodiment the invention.

Referring particularly to FIGS. 11B and 12B, parts shifter 106 is depicted in an extended position. In the depicted example embodiment, similar parts are identified by similar reference numerals as those in depicted in FIGS. 11A and 12A.

Referring particularly to FIGS. 13A, 13B, 14A, 14B, 15A and 15B, indexing wheel structure 104 and heating station 108 are depicted.

Figure 13A:
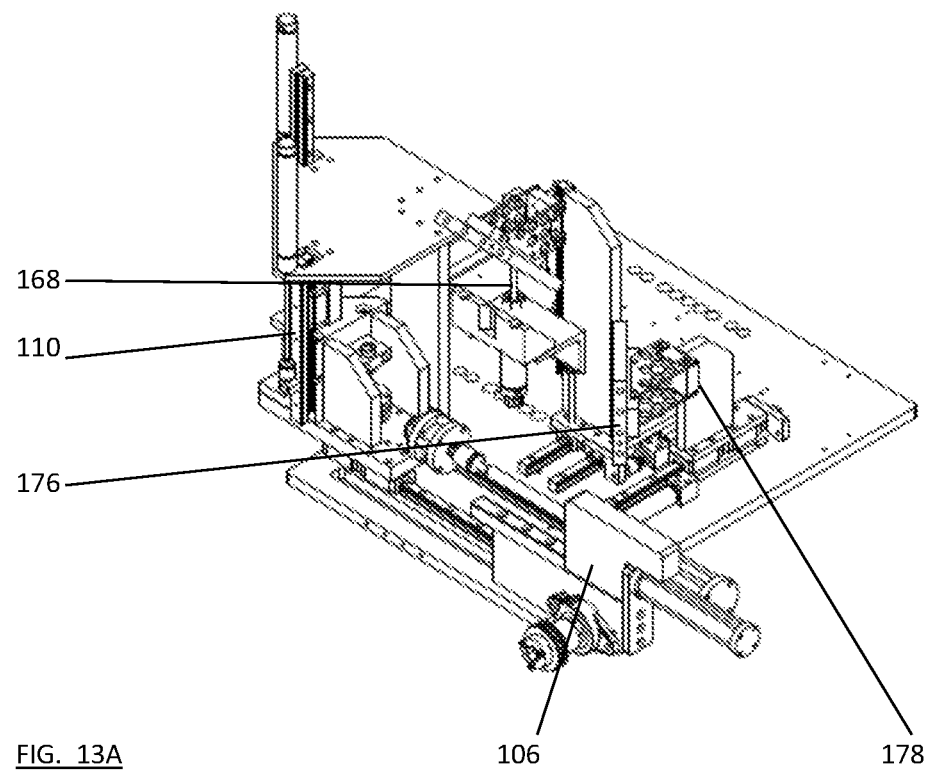
FIG. 13A is a perspective view depicting a heater plate and product support according to an example embodiment of the invention.
Figure 13B:
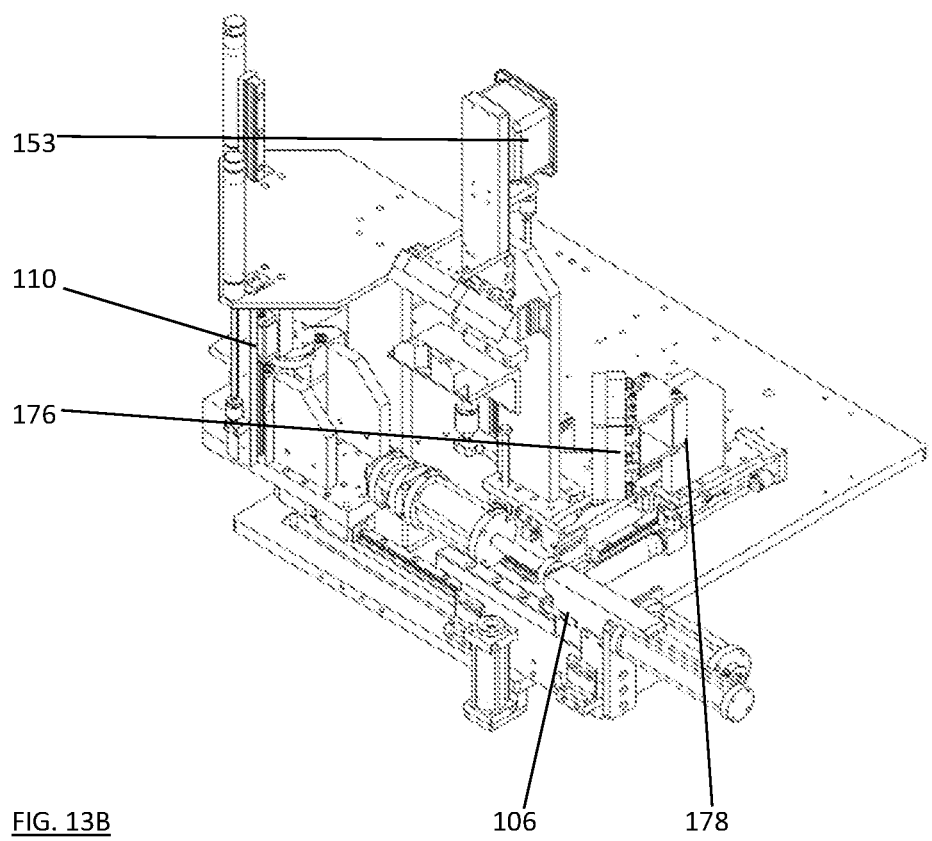
FIG. 13B is a perspective view depicting a heater plate, product support and one or more servomotors according to a further example embodiment of the invention.

Referring to particularly to FIGS. 13A and 13B, heating plate actuator 168, fusing station 110, alignment plate 176, parts shifter 106, alignment plate positioner 178 and heater servomotor 153 are depicted.

Figure 14A:
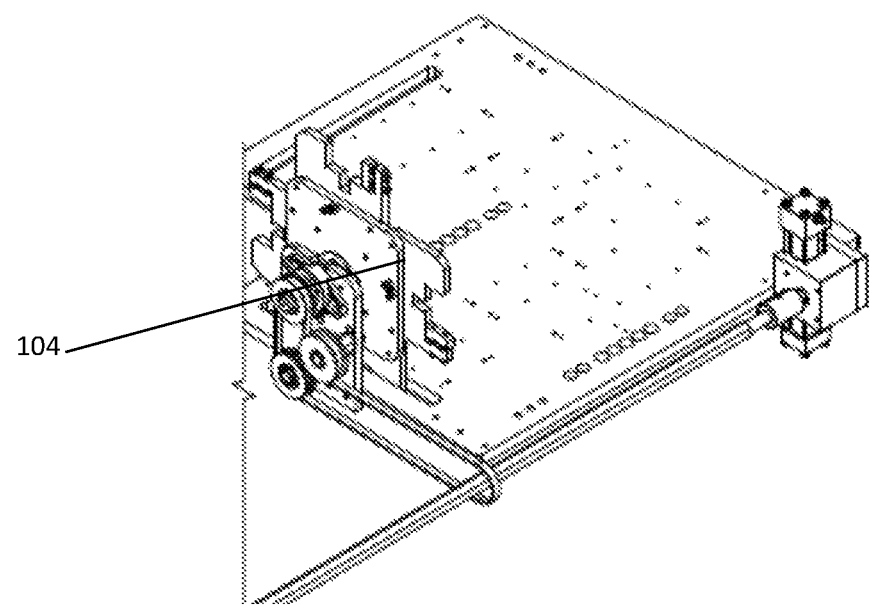
FIG. 14A is a perspective view of a wheel structure according to an example embodiment of the invention.
Figure 14B:
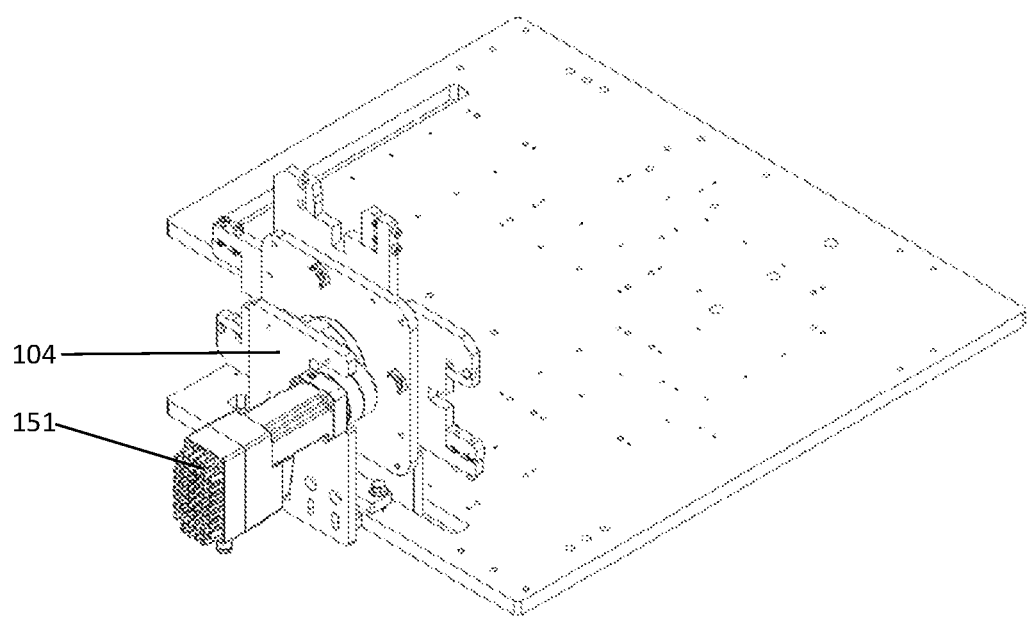
FIG. 14B is a perspective view of a servo motor driven wheel structure according to a further example embodiment of the invention.

Referring particularly to FIGS. 14A and 14B, wheel structure 104 and wheel servomotor 151 are depicted in a first perspective view.

Figure 15A:
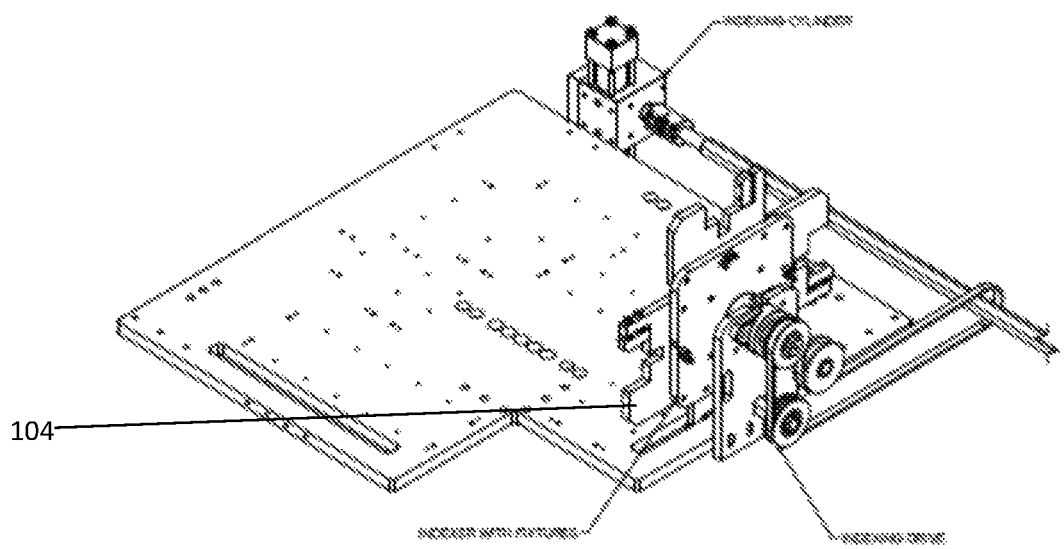
FIG. 15A is a perspective view of an indexer according to an example embodiment of the invention depicting an indexing cylinder, indexing drive and fixtures.
Figure 16A:
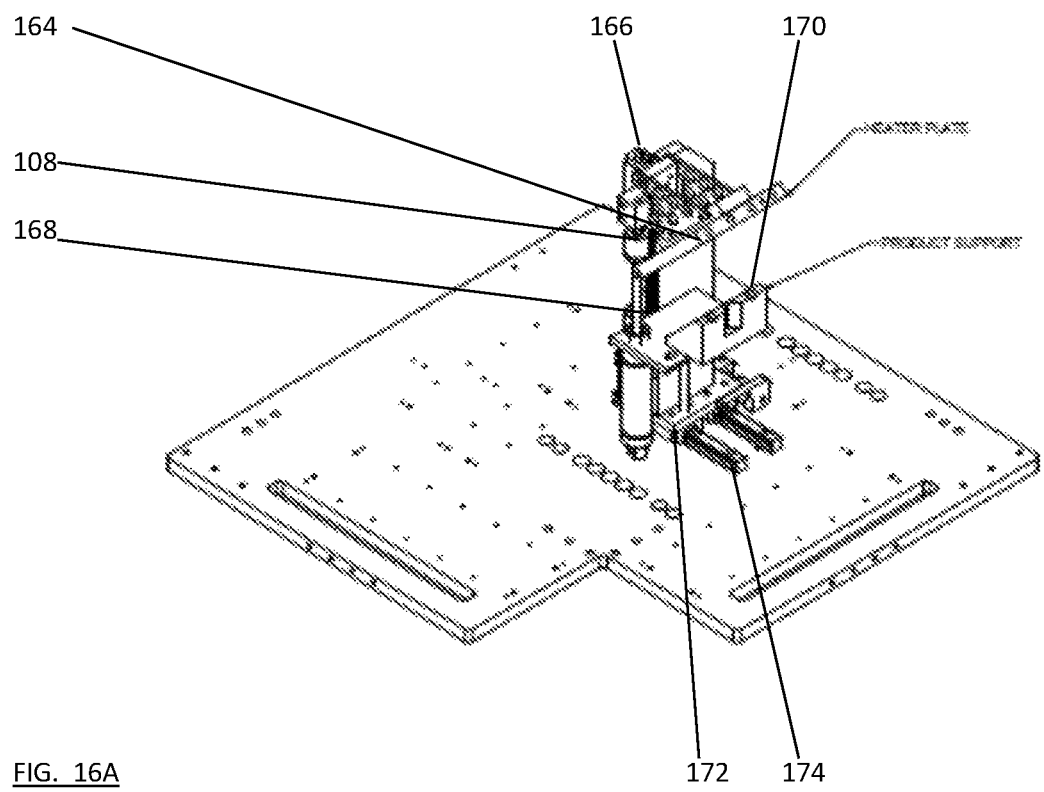
FIG. 16A is a perspective view of a heater plate and product support according to an example embodiment of the invention.
Figure 17A:
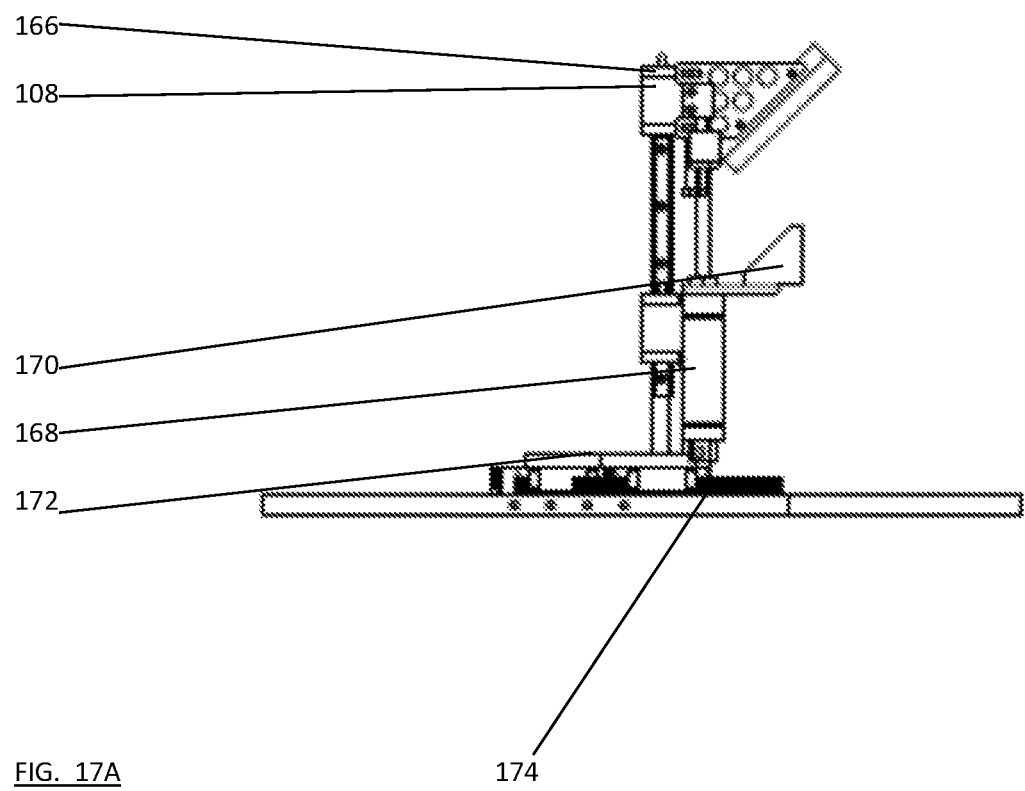
FIG. 17A is an elevational view of heater plate and product support as depicted in FIG. 16 according to an example embodiment of the invention.
Figure 15B:
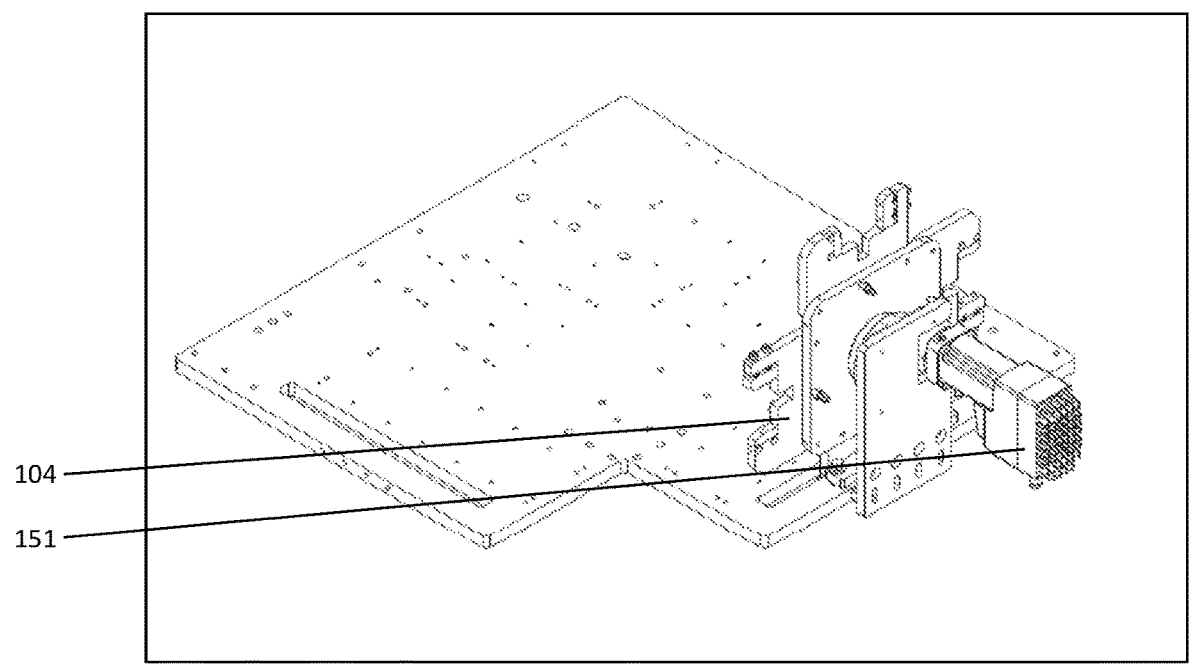
FIG. 15B is a perspective view of an indexer according to a further example embodiment of the invention depicting an indexing cylinder, indexing drive, fixtures and one or more servomotors.
Figure 16B:
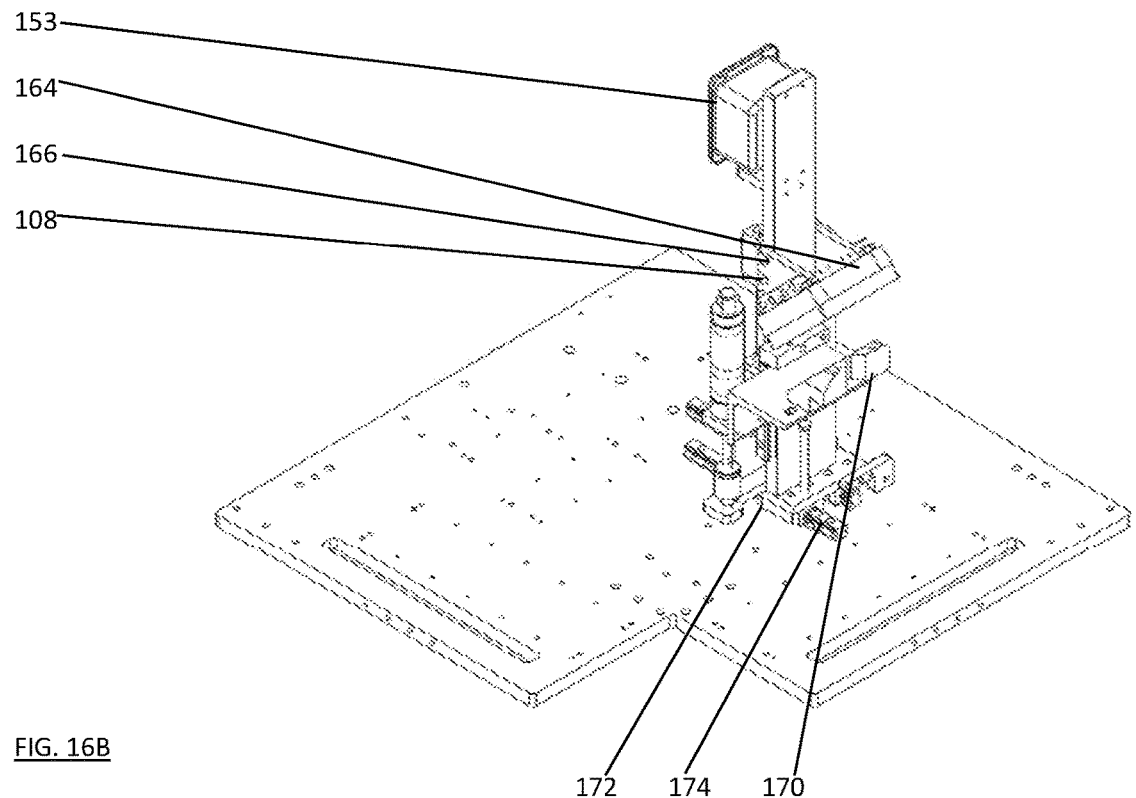
FIG. 16B is a perspective view of a servo motor actuated heater plate and product support according to a further example embodiment of the invention.
Figure 17B:
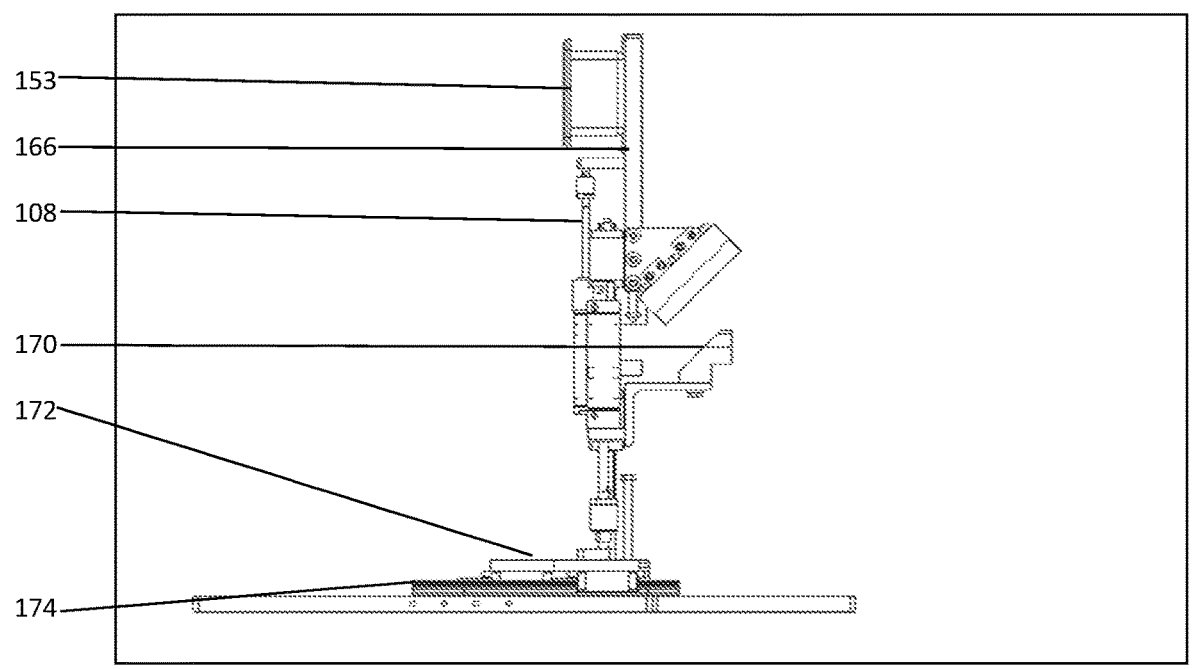
FIG. 17B is an elevational view of servomotors actuated heater plate and product support as depicted in FIG. 16B according to a further example embodiment of the invention.

Referring particularly to FIGS. 15A and 15B, wheel structure 104 and wheel servomotor 151 are depicted in a second perspective view.

Figure 2:
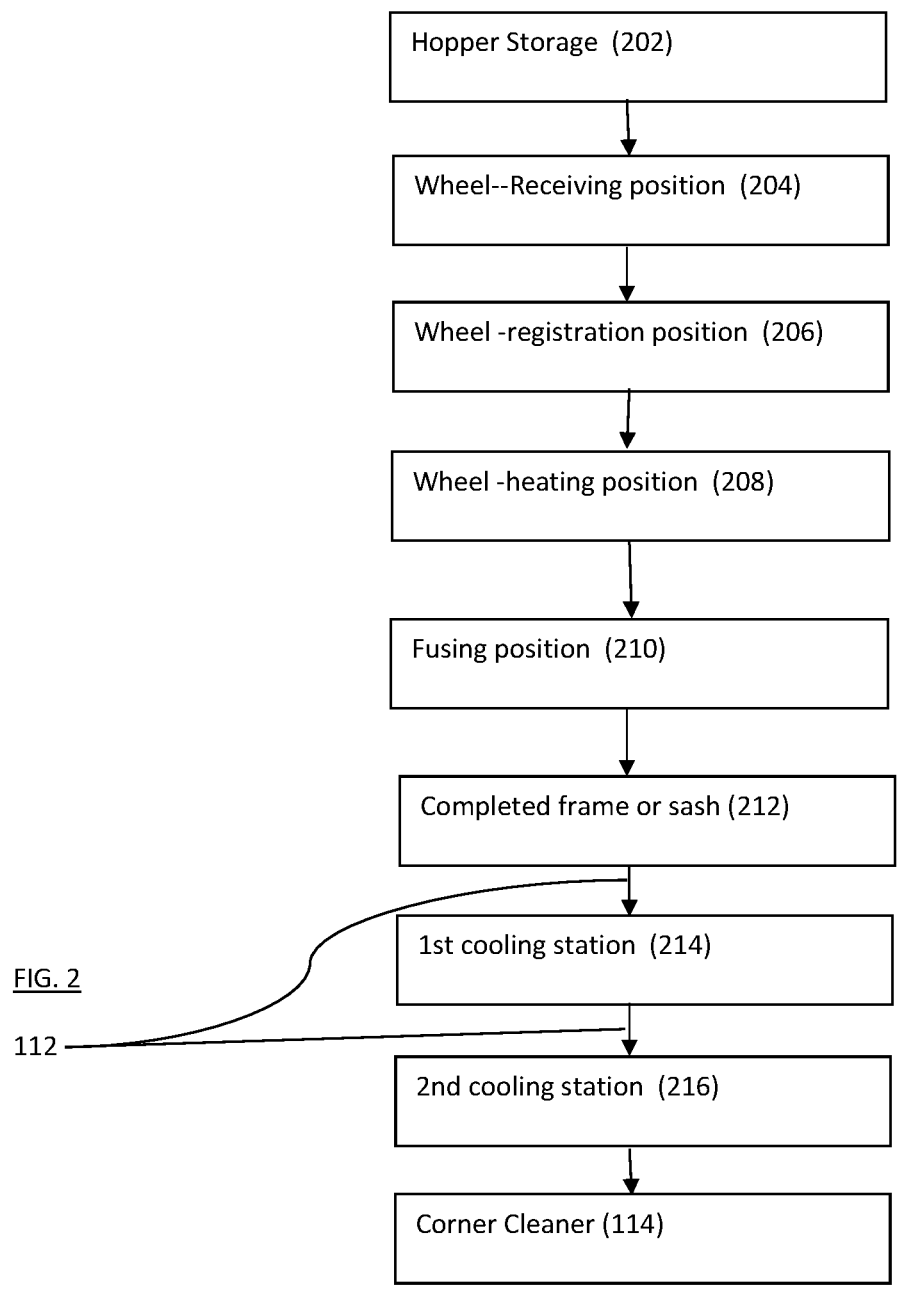
FIG. 2 flowchart depicting the handling of frame or sash parts according to an example embodiment of the invention.

Referring to FIG. 2, a flowchart of movement of frame or sash parts 126 is depicted. During the production process frame or sash parts 126 begin processing in hopper storage 202. Frame or sash parts 126 are loaded in the hopper storage 202 by an operator. Frame or sash parts 126 are moved from the hopper storage 202 into wheel structure 104, at receiving position 204. Frame or sash parts 126 are then positioned with wheel structure 104 at registration position 206. Registration is attained by pressing alignment plate 176 against frame or sash parts 126 at ends thereof which are generally cut a 45-degree angle for rectangular frames or sashes. Frame or sash parts 126 are then rotated with wheel structure 104 to heating position 208 adjacent heating station 108 where heating plate 164 is pressed against ends thereof by heating plate actuator 168 thus melting ends of frame or sash parts 126. Frame or sash parts 126 are then rotated further along with wheel structure 104 to fusing position 210. At fusing position 210 ends of adjacent frame or sash parts 126 are brought together and held together for a sufficient length of time for melted plastic material to at least partially solidify and fuse. Completed frame or sash 212 is then transferred from fusing position 196 to first cooling station 214. Completed frame or sash 212 is held at first cooling station 214 for a period of time, for example approximately 20 seconds. Completed frame or sash 212 is then transferred to second cooling station 216 and held there for a period of time, for example approximately 20 seconds. If desired or necessary, further cooling stations can be utilized.

Following cooling stations completed frame or sash 212 may be transferred to corner cleaner 114 which is generally conventional and not further described here.

According to another example embodiment the invention includes a method of making welded plastic fenestration structures, including: loading parts into parts storage bins that are structured to store and support the parts to be assembled to create the plastic fenestration structures; transferring parts from the parts storage bins to wheels that receive the parts from the parts storage bins; positioning the parts relative to each other by application of aligners; applying heat to ends of the parts by bringing the ends into contact with heating plates thereby rendering at least a portion of the ends of the parts molten; transferring the parts from a heating position to a fusing position by movement of the wheels and by application of parts shifters operably shiftable between a first position adjacent the wheels and a second position remotely located from the wheels and abutting together adjacent parts at the fusing position to produce the plastic fenestration structure; and transferring the plastic fenestration structure to at least one cooling station.

According to another example embodiment, the method includes supporting parts in a vertically stacked orientation adjacent corners of the welder.

According to another example embodiment, the method includes indexing the wheels to four different positions present at least four parts receiving cavities and are shiftable to four indexed positions.

According to another example embodiment, the method includes contacting two ends of the adjacent parts with two opposing heated sides of the heating plates.

According to another example embodiment, the method includes stacking the at least one cooling station vertically relative to the fusing station.

According to another example embodiment, the method includes stacking at least a second cooling station stacked vertically relative to at least one first cooling station.

According to another example embodiment, the method includes cleaning corners of the plastic fenestration structures following the at least one first cooling station.

According to another example embodiment, the method includes engaging each of the parts in wheel structures having multiple parts receiving cavities and gripping structures that receive and grip the parts.

According to another example embodiment, the method includes locating the wheel between the parts hoppers and the fusing station and receiving the parts from the parts hoppers and transferring the parts to the heating station and then to the fusing station.

According to another example embodiment, the method includes angling the heating plates 45° to the horizontal.

In operation, an operator of a high-speed welder 100 fills parts hoppers 102 with frame or sash parts 126. Frame or sash parts 126 are stacked vertically and supported at ends thereof by parts hoppers 102. Frame or sash parts 126 are transferred from the bottom of parts hoppers 102 to wheel structures 104. Frame or sash parts 126 are received within parts receiving cavity 140. Linear actuator 128 transports frame or sash parts 126 from parts hoppers 102 to wheel structure 104 where they are received in parts receiving cavity 140.

Alignment plate 176 is then pressed against and hand frame or sash part 126 by alignment plate positioner 178 thus locating frame or sash part as desired.

Wheel structure 104 that rotates approximately 90° from alignment position 182 to heating position 184 so that ends of frame or sash parts 126 are proximate heating plate 164. Heating plate actuator 160 age brings heating plate 164 into contact with frame or sash parts 126. Contact is maintained until ends of frame or sash parts 126 at least partially molten. Wheel structure 140 rotates a further 90° to fusing position 186. Parts gripper 152 is then advanced along linear track and 56 supported by linear slider 158 and moved by linear actuator 160 until frame or sash parts 126 are abutted and held together in fusing position 186. Frame or sash parts 126 are allowed to solidify at least partially and are thus fused together.

The resulting completed frame or sash 212 is moved to first cooling station 214 for a period of cooling. Optionally frame or sash parts 126 assembled as a completed frame or sash 212 are moved to second cooling station 216 for further cooling. Once cooling is complete the finish structure may be moved to corner cleaner 114 for corner cleaning.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A welder for constructing and welding plastic fenestration structures, comprising:
    parts storage bins that are structured to store and support parts to be assembled to create the plastic fenestration structures;
    wheels having parts receiving structures that receive the parts from the parts storage bins;
    aligners that position the parts relative to one another;
    heating plates that apply heat to ends of the parts thereby rendering at least a portion of the ends of the parts molten;
    parts shifters operably shiftable between a first position adjacent the wheels and a second position remotely located from the wheels that shift the parts to a fusing position in which adjacent parts are abutted together at a fusing station to produce a plastic fenestration structure; and
    at least one cooling station at which the plastic fenestration structure is held while cooling; and wherein the parts are transferred from a heating position to the fusing position by movement of the wheels and by application of the parts shifters.

2. The welder as claimed in claim 1, wherein the parts storage bins are adjacent corners of the welder and are oriented to hold the parts in a vertically stacked orientation.

3. The welder as claimed in claim 1, wherein the wheels each present at least four parts receiving cavities and are shiftable to four indexed positions.

4. The welder as claimed in claim 1, wherein the heating plates have two opposing heated sides that are accessible to the parts and are positioned so as to heat adjacent ends of two parts simultaneously or the heating plates are positioned to heat an end of the parts prior to the parts being shifted to the fusing position.

5. The welder as claimed in claim 1, wherein the at least one cooling station is stacked vertically relative to the fusing station.

6. The welder as claimed in claim 1, further comprising at least one servomotor operably coupled to at least one of the wheels or the heating plates that actuate motion of the at least one of the wheels or the heating plates.

7. The welder as claimed in claim 1, further comprising a corner cleaner following the at least one first cooling station.

8. The welder as claimed in claim 1, further comprising the wheels having multiple parts receiving cavities and gripping structures that receive and grip the parts.

9. The welder as claimed in claim 8, wherein the wheels are located between the parts storage bins and the fusing station and receive the parts from the parts storage bins and transfer the parts to a heating station and then to the fusing station.

10. The welder as claimed in claim 1, wherein the heating plates are angled at 45° to the horizontal.

11. A method of making welded plastic fenestration structures, comprising:
    loading parts into parts storage bins that are structured to store and support the parts to be assembled to create the plastic fenestration structures;
    transferring parts from the parts storage bins to wheels having parts receiving structures that receive the parts from the parts storage bins;
    positioning the parts relative to each other by application of aligners;
    applying heat to ends of the parts by bringing the ends into contact with heating plates thereby rendering at least a portion of the ends of the parts molten;
    transferring the parts from a heating position to a fusing position by movement of the wheels and by application of parts shifters operably shiftable between a first position adjacent the wheels and a second position remotely located from the wheels and abutting together adjacent parts at the fusing position to produce a plastic fenestration structure; and
    transferring the plastic fenestration structure to at least one cooling station.

12. The method as claimed in claim 11, further comprising supporting the parts in parts storage bins adjacent corners of a welder comprising the wheels, the aligners, the heating plates, the parts shifters, and the at least one cooling station and in a vertically stacked orientation.

13. The method as claimed in claim 11, further comprising indexing the wheels to four different positions to present at least four parts receiving cavities.

14. The method as claimed in claim 11, further comprising contacting two ends of the adjacent parts with two opposing heated sides of the heating plates or contacting the heating plates to heat an end of the parts prior to the parts being shifted to the fusing position.

15. The method as claimed in claim 11, further comprising stacking the at least one cooling station vertically relative to the fusing position.

16. The method as claimed in claim 11, further comprising utilizing at least one servomotor operably coupled to at least one of the wheels or the heating plates that actuates motion of the at least one of the wheels or the heating plates.

17. The method as claimed in claim 11, further comprising cleaning corners of the plastic fenestration structures following the at least one first cooling station.

18. The method as claimed in claim 11, further comprising engaging each of the parts in the wheels having multiple parts receiving cavities and gripping structures that receive and grip the parts.

19. The method as claimed in claim 18, further comprising locating the wheels between the parts storage bins and a fusing station and receiving the parts from the parts storage bins and transferring the parts to a heating station and then to the fusing station.

20. The method as claimed in claim 11, further comprising angling the heating plates 45° to the horizontal.

* * * * *